Patented Jan. 26, 1932

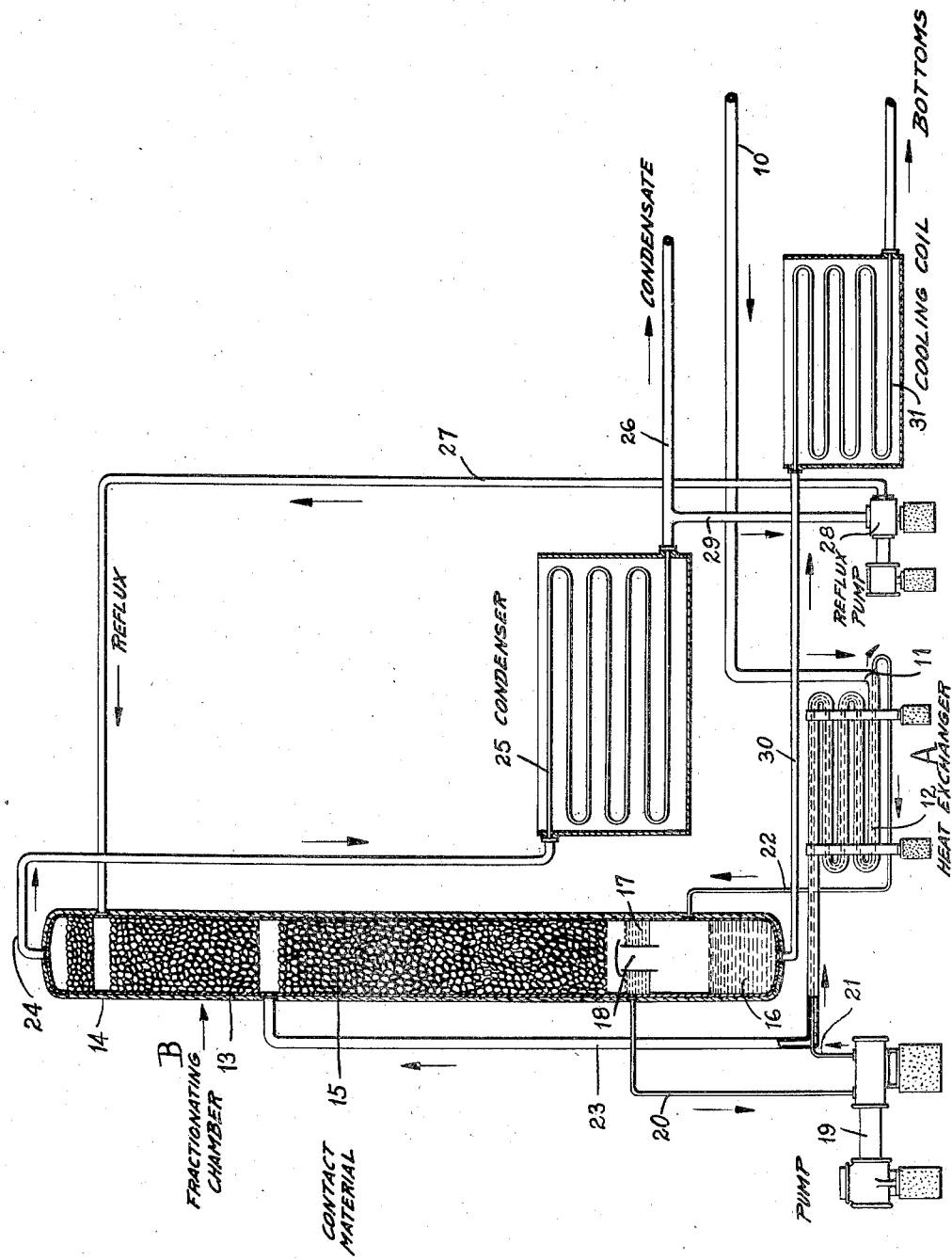

1,842,436

UNITED STATES PATENT OFFICE

CLAUDE W. WATSON AND PERCY C. KEITH, JR., OF PORT ARTHUR, TEXAS, ASSIGNORS, BY MESNE ASSIGNMENTS, TO THE TEXAS COMPANY, OF NEW YORK, N. Y., A CORPORATION OF DELAWARE

FRACTIONAL DISTILLATION

Application filed March 11, 1924, Serial No. 698,375. Renewed November 4, 1930.

This invention relates to the fractionation of fluids and is adapted generally for the separation of fluids containing constituents of different boiling points into particular fractions desired.

In conventional methods of fractionating it is common practice to provide a column or tower within which vapors and liquid are in counter current passage, a final vapor product being taken off at the upper end of the tower and a final liquid condensate being collected at the bottom of the tower. It is common to introduce the fluid to be fractionated into the bottom of the tower so that it comes in direct contact with the liquid collected therein. Such a method of operation has the disadvantage that the liquid withdrawn from the tower will contain quantities of the lighter fractions which should properly be contained in the vapor which is removed from the tower, since this liquid is in equilibrium with the vapor evolved from it and with the entering fluids it is sought to fractionate.

Our invention contemplates an improvement in fractionating operations of such nature that it is possible to obtain, and remove from the fractionating apparatus as vapor, a lighter fraction or fractions containing no appreciable quantity of the heavier or less volatile constituents and to collect also a liquid product comprising the heavier components that contains no appreciable quantity of the lighter fraction or fractions that are removed as vapor. In accordance with our invention the fluid to be fractionated is brought into heat exchange relation, but not in direct contact or equilibrium, with the final liquid condensate collected in the fractionating device so that the heat of the incoming fluid is utilized to vaporize the lighter fractions in the condensate. Thus we provide a fractionating zone in which vapors and liquids are in counter current passage. The liquid collected from the fractionating zone is withdrawn and brought into heat exchange relation with the fluid to be fractionated whereby the withdrawn liquid is heated and vaporized to a greater or less extent. The heated liquid is then utilized in such a manner as to create a current of upwardly rising vapors which passes into the fractionating zone. The fluid to be fractionated, after having thus been brought into heat exchange relation (but not in equilibrium) with the liquid condensate, is discharged into the fractionating zone at a predetermined point therein.

An important feature of the invention resides in the maintenance of the final liquid condensate collected in the fractionating apparatus at a temperature in excess of that of the entering fluids, without the use of steam or other extraneous heating means. By bringing liquid condensate obtained from the fractionating zone into heat exchange relation with the heated fluids to be fractionated, prior to the introduction of same into the fractionating zone, and then introducing the liquid thus heated into the final condensate collected, this final liquid pool may be maintained at a temperature in excess of that of the entering charge or of that of any other point of the fractionating apparatus. The heated vapor rising from this pool and passing into the fractionating zone insures a heat current through the zone such that maximum fractionation may be effected. In other words, the liquid refluxing through the zone is met with a current of vapor such that the desired revaporizations will occur. There is a temperature gradient through the fractionating zone so that refluxing liquid will in passage continually come in contact with zones of increasing temperature. And since the final condensate is maintained at a temperature in excess of that of any point in the fractionating zone and at the same time is not in equilibrium with the entering charge this liquid will contain the minimum quantity of lighter components.

As the invention has a special field of usefulness in connection with the distillation and fractionation of hydrocarbons, such as crude petroleum and the various products thereof, it will be described herein in detail with particular reference to the distillation of hydrocarbon oils.

The invention is best described by reference to specific apparatus constituting an example thereof and for the purpose of fully disclosing the invention reference will now be had to the accompanying drawing which shows a diagrammatic elevation of an apparatus constructed in accordance with the invention and constituting an embodiment thereof.

The apparatus thus illustrated comprises an exchanger A and a fractionating apparatus B. The fluid to be fractionated is admitted through a pipe 10. This pipe may constitute, for example, a vapor line extending from a still wherein hydrocarbon oils are being vaporized so that the material in the line consists essentially of hydrocarbon vapors. The still may be operated at normal pressure, under a vacuum or diminished pressure, or under a superatmospheric pressure, and simple distillation or destructive distillation or cracking may be carried on in the still. The material to be fractionated may likewise comprise mixed vapors and liquid. Thus, for example, the fluid may consist of the heated products obtained from a stripping still, tubular or otherwise, operated for example under superatmospheric pressure. It is to be understood that the invention does not relate per se to the method of originally heating the material to be fractionated and that the invention has in view the treatment of fluids, from whatever source derived, consisting of components in the vapor or gaseous state, or of constituents comprising a mixture of liquids and vapors or gases or both, so as to obtain desired fractions.

The pipe 10 is adapted to conduct the heated fluid to be fractionated to a heat exchanger A. The heat exchanger is arranged for the passage of separate fluids in heat exchange relation with each other and may be of any particular design desired. As shown, the exchanger comprises concentric pipes 11 and 12 arranged in the form of a coil. The pipe 10 may communicate with either element of the exchanger, that is, with either the inner or outer channel; it is shown as communicating with the outer coil 11.

The fractionating apparatus B is preferably arranged in the form of a rectifying column or tower 13 and to obtain best results should be provided with insulation such as 14. The chamber 13 is provided with suitable means for effecting proper contact between vapors and liquid so as to produce repeated distillations and condensations whereby fractionation may be effected. The chamber is shown as being provided with contact material 15. Any of the conventional contact arrangements common in rectifying and fractionating equipment may be used, such as bubble trays or compartments, broken stone or other fragmentary material, various types of fractionating rings and other contact elements, etc.

The fractionating apparatus is provided at the bottom with a space for the collection of a pool 16 which constitutes the final liquid condensate obtained in the apparatus. Intermediate the fractionating zone proper, denoted by the contact material 15, and the pool 16 means is provided, as at 17, for collecting a pool of liquid condensate derived from the fractionating zone. Means is provided at 18 to permit the passage of vapors from the space 16 into the fractionating zone 15. A pump 19 has an inlet line 20 communicating with the pool 17 and an outlet pipe 21 which terminates in the heat exchanger coil 12. A pipe 22 extends from the coil 12 to a point below the pool 17 so as to discharge fluid into the pool 16. Liquid from the pool 17 may thus be drawn off and brought into heat exchange relation with the fluid which is passed through the coil 11 and the heated fluid conducted by the pipe 22 to the pool 16. As indicated in the drawing, the fluids flow through the heat exchange coils 11 and 12 in counter current.

A pipe 23 is provided to conduct fluid from the pipe 11 to the fractionating zone. As is illustrated, the pipe 23 preferably terminates at an intermediate point in the fractionating zone.

A vapor line 24 is provided to remove vapors from the tower. It is shown as terminating in a condenser coil 25 provided with an outlet 26.

The fractionating apparatus is provided with suitable means for creating a reflux liquid adapted to pass down through the fractionating zone in counter current to the flow of vapors. Various means may be used to accomplish this object. Thus the upper portion of the tower may be provided with a cooling coil to create sufficient cooling to initiate the formation of reflux liquid or a reflux condenser may be inserted in the vapor line 24 with a backtrap line for refluxing liquid to the upper part of the chamber. In the arrangement shown a pipe 27 is provided for admitting a cooling liquid to the upper portion of the fractionating zone and a pump 28 for handling the cooling liquid is shown as having an inlet pipe 29 communicating with pipe 26 so that a portion of the condensate from the coil 25 may be utilized as a cooling or refluxing medium.

A pipe 30 which, if desired, may extend to a cooling coil 31 is provided for withdrawing liquid from the pool 16.

In practicing the invention the heated fluid to be fractionated is passed through a pipe 10 and thence through the exchanger A in counter current heat exchange with the liquid drawn off from the pool 17. The fluid to be fractionated is thus cooled to a certain extent while the material withdrawn from the fractionating apparatus is heated. The fluid it is desired to fractionate is then admitted to the fractionating zone wherein the counter currents of vapor and liquid produce successive redistillations and condensations with the resultant accumulation of liquid in the pool 17. This liquid is withdrawn, as stated, brought into heat exchange relation but not into equilibrium with the incoming heated fluids and then conducted to the pool 16. Any of the lighter components which properly belong in the vapors removed through the vapor line 24 but which are held in solution in the liquid removed from the pool 17 are vaporized by means of the heat received in passage through the exchanger A and upon being released into the chamber at the bottom of the fractionating tower the vapors pass off from the pool 16. A current of vapors is thus initiated which passes upwardly into the fractionating zone supplying heat thereto.

It is apparent that when the fluid to be fractionated is admitted to the fractionating zone that the upwardly rising vapors come in contact with the reflux liquid flowing downwardly therein so that the vapor which passes through the vapor line 24 and is collected as a condensate in the condenser 25 is thus substantially free from heavy ends or constituents of higher boiling point than that desired. The liquid passing downwardly through the apparatus is continually met with currents of vapor of progressively increasing temperature and the condensate collected from the fractionating zone in the pool 17 by being brought into heat exchange relation with the heated vapors or other fluid being admitted to the fractionating apparatus, but not coming into direct contact or equilibrium therewith, is substantially free from the lighter constituents so that the final liquid collected in the pool 16 and withdrawn through the pipe 30 contains none, or at least a minimum, of the lighter bodies, that is, those constituents which properly belong in the vapors passing out through the line 24. By means of our invention it is comparatively easy to take off from a fractionating apparatus an overhead distillate having an end boiling point lower than that of the initial boiling point of the bottoms or final liquid condensate withdrawn from the apparatus.

Although the preferred embodiment of the invention has been set forth in connection with apparatus having a particular construction and arrangement of parts and mode of operation, it is obvious that various changes and modifications may be made therein, while securing to a greater or less extent some or all of the benefits of the invention, without departing from the spirit and scope thereof. Therefore, only such limitations should be imposed as are indicated in the appended claims.

What we claim is:

1. Apparatus for fractionating fluids comprising a fractionating chamber, a heat exchange element adapted for the flow of separate fluids in counter current through separate channels in heat exchange relation to each other, means for admitting fluid to one of the channels of the heat exchanger, means for conducting fluid from said channel of the heat exchanger to a predetermined mid-point in said fractionating chamber, means for withdrawing liquid at a lower point in said chamber and admitting it to the other channel of the heat exchanger and means for conducting liquid from said latter channel to a still lower portion of said fractionating chamber.

2. Apparatus for fractionating fluids comprising a chamber, means for admitting to the chamber fluid to be fractionated, means for collecting a pool of condensate from the fractionating chamber, means for withdrawing liquid from said pool and bringing same into counter current heat exchange relation with the fluid to be fractionated and means for returning the fluid thereby heated to the fractionating chamber.

3. In combination with a fractionating apparatus, a heat exchanger consisting of separate conduits adapted for the flow of separate fluids, means for admitting the fluid to be fractionated to one of said conduits, means for conducting the fluid from said conduit to the fractionating apparatus, means for withdrawing liquid from the fractionating apparatus at a predetermined point and conducting same in a direction opposite to the flow of said fluid, through the other of said conduits and means for returning the heated liquid to the fractionating apparatus at a lower point.

4. The method of fractionating fluids that comprises admitting fluid to a fractionating chamber wherein it is subjected to fractional distillation, withdrawing liquid from said chamber at a point below that at which said fluid is admitted, passing the liquid thus withdrawn in heat exchange relation and in counter current with said fluid prior to its introduction to the fractionating chamber, and passing the liquid thereby heated to the bottom of the fractionating chamber.

5. The process of fractionating fluids that comprises maintaining a pool of condensate collected in the lower portion of a fractionating tower at a higher temperature than the hot fluid delivered to the tower for fractionation by abstracting heat from the fluid to be fractionated at a point outside the tower and imparting such abstracted heat to the lower pool, and then passing all the fluid from which heat has been so abstracted directly into the fractionating tower at a predetermined intermediate point thereof.

In witness whereof we have hereunto set our hands this 29th day of February, 1924.

C. W. WATSON.
P. C. KEITH, JR.

CERTIFICATE OF CORRECTION.

Patent No. 1,842,436. January 26, 1932.

CLAUDE W. WATSON ET AL.

It is hereby certified that error appears in the printed specification of the above numbered patent requiring correction as follows: Page 3, line 88, claim 2, for "fluid" read liquid; and that the said Letters Patent should be read with this correction therein that the same may conform to the record of the case in the Patent Office.

Signed and sealed this 27th day of September, A. D. 1932.

(Seal)

M. J. Moore,
Acting Commissioner of Patents.